United States Patent [19]  [11] 4,191,706
Marquis et al.  [45] Mar. 4, 1980

[54] AROMATIC AMINE-AMIDES AND USE AS CHAIN-EXTENDERS

[75] Inventors: Edward T. Marquis; Ernest L. Yeakey, both of Austin, Tex.

[73] Assignee: Texaco Development Corp., White Plains, N.Y.

[21] Appl. No.: 895,840

[22] Filed: Apr. 13, 1978

[51] Int. Cl.² .................. C07C 103/28; C07C 103/78; C07C 103/82; C07C 99/04
[52] U.S. Cl. .................................. 260/559 A; 544/94; 528/73; 260/584 B
[58] Field of Search ....................... 260/559 A, 584 B; 544/94; 528/73

[56]  References Cited
U.S. PATENT DOCUMENTS 3,351,659  11/1967  Santilli et al. .......................... 544/94
3,409,668  11/1968  Palazzo et al. ................... 260/559 A
3,654,370  4/1972   Yeakey ............................. 260/584 B Primary Examiner—Winston A. Douglas
Assistant Examiner—Raymond K. Covington
Attorney, Agent, or Firm—Carl G. Ries; Thomas H. Whaley; James L. Bailey

[57]  ABSTRACT

Covers certain aromatic-amine amides which comprise the reaction product of a polyoxypropylene polyamine selected from the group consisting of diamines, triamines and mixtures thereof, and having an average molecular weight of 190 to about 3000 and an isatoic anhydride of the formula:

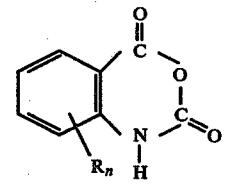

where R is selected from the group consisting of hydrogen, alkyl, nitro, halo, hydroxy, amino, and cyano, and n is a number of 1-4. Also covers the use of said compounds as chain-extenders in polyurethane compositions. Such chain-extenders provide for the production of polyurethane elastomers having improved tensile strength, tear strength and elongation properties.

6 Claims, No Drawings

AROMATIC AMINE-AMIDES AND USE AS CHAIN-EXTENDERS

BACKGROUND OF THE INVENTION

When an organic polyisocyanate is reacted with a polyether polyol to produce a polyurethane composition, various components are introduced into the system in order to adjust the physical properties of the resulting polyurethane composition. For example, if a cellular product is desired, water or an appropriate blowing agent is added to the polyurethane reaction mixture. In order to adjust properties of various polyurethane compositions such as the tensile strength, elongation, tear strength, flexibility, the softness or hardness of the resulting composition, or the color, various other additives are used. Often the addition of an additive to improve one particular property results in the degradation of other properties of the polyurethane composition. For instance, an additive which increases the tensile strength of a solid polyurethane composition such as various fillers may result in a decrease in the elongation of the resulting polyurethane composition. Therefore, it is necessary to achieve a balance of properties for a given use.

Solid polyurethane compositions have found usefulness in gaskets, sealants, floor coverings, and the like. More recently, with the advent of molded, rigid plastics, it has become desirable to provide a flexible polyurethane mold for use in the place of the more expensive silicone-type molds currently being used. In order for a polyurethane composition to be acceptable for this use, it must be soft and flexible, yet have good tensile and tear strength so that the mold does not become unusable after a short period of time due to tears or splits in the mold material. Heretofore, polyurethane compositions have not been acceptable for this purpose.

Polyurethane compositions generally in use as floor coverings are systems dissolved in a solvent which are moisture-cured by the atmosphere after application on the floor. These floor coatings have been found to suffer considerably from "bleed through", especially when placed on a substrate which had previously been covered with some other type of floor covering. While there are some single component floor coatings (i.e., solvent types), these have been found to be lacking in one or more of the desired properties for an acceptable floor coating. To be an acceptable floor covering composition, it is desirable that the elastomer be strong, scuff-resistant and yet flexible enough to conform to shifts in the floor.

With the widespread use of foam crash pads in automobiles and the like, it has become desirable to develop a crash pad with a tough scuff-resistant skin which is integral to the foam of the crash pad itself. Previously, it was necessary to line the mold in which the crash pad was to be cast with a decorative coating such as vinyl and the like in order to achieve the strength and scuff-resistance necessary for the pad, and yet maintain an attractive appearance of the crash pad itself. Previous attempts at producing a polyurethane foam crash pad having an integral skin which would meet these qualifications have met with considerable difficulty and disappointing results.

The advantages and objects of our invention will be apparent to those skilled in the art, in view of the aforementioned background, the following discussion and accompanying examples.

SUMMARY OF THE INVENTION

This invention relates to aromatic amine-amide compositions which comprise a reaction product of a polyoxypropylene polyamine selected from the group consisting of diamines, triamines and mixtures thereof, and having an average molecular weight of 190 to about 3000 and an isatoic anhydride of the formula:

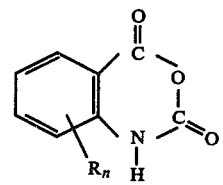

where R is selected from the group consisting of hydrogen, alkyl, nitro, halo, hydroxy, amino, and cyano, and n is a number of 1-4.

The invention also relates to the production of polyurethane compositions having improved physical properties due to presence of the above compounds which act as chain-extenders.

The chain-extender of the invention is incorporated into the reaction mixture of an organic isocyanate and an organic polymeric polyhydroxy compound such as polyester or polyether polyols used for the production of polyurethane compositions, along with a urethane catalyst and various additives frequently used in the polyurethane art.

DETAILED DESCRIPTION OF THE INVENTION

Particularly preferred chain extenders derived from diamines have the following structural formula:

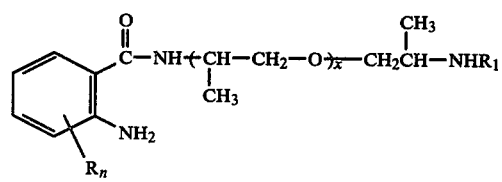

where $R_1$ is hydrogen or:

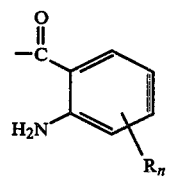

and x is an average number ranging from about 2 to about 40.

Preferred chain-extenders prepared from triamines have the following structural formula:

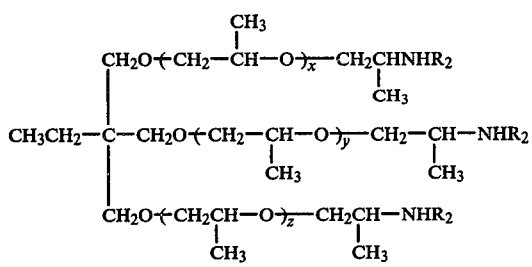

where $R_2$ is hydrogen or:

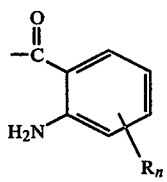

where x, y and z represent average numbers ranging from about 1 to about 15 with the sum of x, y and z ranging from about 3 to about 50.

In order to prepare the above compounds an isatoic anhydride of the formula:

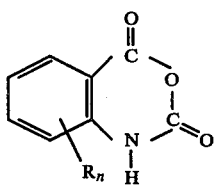

where R is selected from the group consisting of hydrogen, alkyl, nitro, halo, hydroxy, and cyano and n is a number of from 1 to 4, is reacted with a polyoxypropylene polyamine. The isatoic anhydrides are well known materials, and their preparation need not be discussed in detail. A preferred reactant is isatoic anhydride itself, where $R_n$ is H.

Polyoxypropylene polyamines, and procedures for their preparation, useful in producing the chain-extenders of the invention are well-known and amply described in the literature. See, for example, U.S. Pat. No. 3,654,370.

Preferably, we employ polyoxypropylene diamines of the formula:

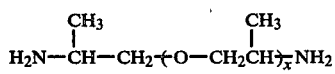

wherein x is an integer of from about 2 to about 40, and polyoxypropylene triamines of the formula:

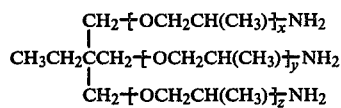

where x, y and z represent integers in the range of about 1 to 15, and the sum of x, y and z is from about 3 to about 50. The most preferred polyoxypropylene diamines of the formula have average molecular weights between about 230, where x is an average of 2.6 to about 2,000 where x is an average of about 33.1. Preferred polyoxypropylene triamines of the above formula have average molecular weights between about 190 to about 3,000. These polyoxypropylene di- and triamines are readily available commercially in a wide variety of molecular weight ranges, such as those sold by Jefferson Chemical Company, Inc., Houston, Texas, under the trademark JEFFAMINE ®.

In order to make the products of the invention, the above reactants are simply mixed together without necessity of solvent or diluent and heated. When the reaction is finished, the product requires no further treatment or purification. In addition, no catalyst is necessary to effect the reaction. The products are generally viscous liquid (pourable when warm) rather than crystalline solids. The temperature of reaction may range from about 20° C. to about 200° C. at a pressure ranging from atmospheric pressure to about 1000 psig.

When one mole of the isatoic anhydride is added per mole of diamine only one of the terminal amine groups is reacted to produce a monoamide also containing one aromatic and one aliphatic amine group. On the other hand if two moles of the anhydride are reacted with one mole of the diamine both terminal groups are reacted to produce a diamide structure containing two aromatic amine groups. A corresponding situation, of course exists with respect to reaction of the isatoic anhydride with a triamine. That is, 1,2, or 3 of the terminal amines may be reacted to produce a mono-, di-, or triamide structure.

The above chain-extenders are particularly useful in preparing improved solid polyurethane compositions useful as sealants, floor coatings and molds. In addition, when employing the additives of the invention one may provide an integral skin on a foamed cellular polyurethane composition containing the chain-extenders of the invention. This integral skinned cellular polyurethane composition produces a product having the desired properties of a foam crash pad in addition to having a tough, scuff-resistant integral skin, thus, obviating the necessity of lining the mold with a separate skinning material.

As noted above in the production of polyurethane compositions, polymeric polyhydroxy compounds such as polyester or polyether polyols are reacted with organic polyisocyanates to produce a polyurethane composition. Polyether polyols are described herein, and polyester polyols are described in U.S. Pat. No. 3,391,093 for example. This reaction usually occurs in the presence of a catalyst but may occur noncatalytically when a polyol containing tertiary nitrogen atom is used. In the practice of the invention, the above-described chain-extenders are included in this reaction mixture to produce improved polyurethane compositions. When a solid polyurethane composition is produced using the chain-extender of the invention, we have discovered that improved tensile strength, tear strength and elongation results. With the chain-extender of our invention, strong yet flexible floor coverings and sealants are possible. In addition, soft, flexible molds can be produced which have improved tear strength but yet have sufficient compression strength to withstand pressures produced when the mold made from our polyurethane composition must contain an expanding cellular plastic.

Suitable organic polyisocyanates useful in the practice of our invention are those organic diisocyanates, triisocyanates and polyisocyanates well-known in the polyurethane art. Mixed isomers of toluene diisocyanate which are readily commercially available such as those described in U.S. Pat. No. 3,298,976 and the like may be used. Especially preferred are diisocyanates and polyisocyanates prepared by the phosgenation of the reaction product between aniline and formaldehyde such as 4,4'-diphenylmethane diisocyanate, 2,4'-diphenylmethane diisocyanate and higher functionality polyphenylmethylene polyisocyanates, hereinafter called polyarylpolyisocyanates. Especially preferred organic polyisocyanates for forming solid polyurethane compositions are diphenylmethane diisocyanate and modified diphenylmethane diisocyanates sold under the trademark of ISONATE® 143L. Polyarylpolyisocyanates which are used in the practice of our invention, particularly to produce cellular polyurethanes, have a functionality of from about 2.0 to about 3.3. An especially preferred functionality range is from about 2.2 to about 2.9.

Polyether polyols useful in the practice of our invention are those diols, triols, tetrols and mixtures thereof having a molecular weight from about 500 to about 10,000. The diols are generally polyalkylene ether glycols such as polypropylene ether glycol, polybutylene ether glycol, and the like, and mixtures thereof. Mixed polyether polyols can also be used such as the condensation products of an alkylene oxide with a polyhydric alcohol having three or four primary hydroxyl groups such as glycerol, trimethylolpropane, 1,2,6-hexanetriol, pentaerythritol, and the like. These polyether polyols are well-known and may be prepared by any known process such as, for example, the processes discussed in Encyclopedia of Chemical Technology, volume 7, pages 257–262, published by Interscience Publishers, Inc. in 1951.

As mentioned above, any suitable polyhydric polyalkylene ether may be used, such as, for example, the condensation product of an alkylene oxide with a polyhydric alcohol. Any suitable polyhydric alcohol may be used such as, for example, ethylene glycol, 1,2-propylene glycol, 1,3-propylene glycol, 1,4-butylene glycol, 1,3-butylene glycol, glycerine, trimethylolpropane, 1,2,6-hexanetriol, pentaerythritol, and the like. Any suitable alkylene oxide may be used such as, for example, ethylene oxide, propylene oxide, butylene oxide, amylene oxide, their various isomers, and the like. Of course, the polyhydric polyalkylene ether polyols can be prepared from other starting materials such as, for example, tetrahydrofuran, epihalohydrin, aralkylene oxides such as, for example, styrene oxide, and the like. Polyhydric polyether polyols having three or four hydroxyl groups per molecule and a molecular weight of from about 2,000 to about 10,000 can be used. The polyol used can be a blend of diols with triols or tetrols to produce a polyol blend having an average molecular weight of from about 500 to about 10,000. Blended diols and triols for use in solid polyurethane elastomers are generally discussed in U.S. Pat. No. 3,391,101. Most preferred for use either alone or blended with a diol are the polyoxyalkylene triols and tetrols having a molecular weight of from about 2,000 to about 7,000.

The polyether polyols may have primary or secondary hydroxyl group termination. When the polyhydric alcohol is reacted with an alkylene oxide such as propylene oxide, butylene oxide, and the like, the terminal groups are predominantly secondary hydroxyl groups. However, it is within the scope of our invention to use polyether triols or polyether tetrols which have from about 5 to about 15 wt. % ethylene oxide added thereto in a final alkoxylation step by the known alkoxylation processes in order to increase the terminal primary hydroxyl content of the said polyether polyol. The manufacture of ethylene oxide "tipped" polyether polyols is generally discussed in U.S. Pat. No. 3,336,242.

As hereinbefore mentioned, the polyether polyol and the organic polyisocyanate are reacted to form the polyurethane composition. This reaction may occur noncatalytically when a polyol is used which contains tertiary nitrogen compounds or may be carried out in the presence of known polyurethane catalysts. The use of a separate catalyst is preferred. The catalyst employed may be any of the catalysts known to be useful for this purpose, including tertiary amines and metallic salts. Suitable tertiary amines include N-methylmorpholine, N-ethylmorpholine, triethylenediamine, triethylamine, trimethylamine and N-dimethylethanolamine. Typical metallic salts include, for example, the salts of antimony, tin, mercury and iron; for example, dibutyltin dilaurate phenylmercuric acetate and stannous octoate. The catalyst is usually employed in a proportion of from about 0.01% to 2% by weight based on the weight of the overall composition.

Various additives can be employed to provide different properties, e.g., fillers such as clay, calcium carbonate, talc, or titanium dioxide. Dyes and pigments may be added for color and anti-oxidants also may be used.

When the embodiment of our invention is practiced which involves the production of the self-skinning cellular polyurethane product, a foaming agent is employed which may be any of those known to be useful for this purpose such as water, the halogenated hydrocarbons, and mixtures thereof. Typical halogenated hydrocarbons include but are not limited to monofluorotrichloromethane, difluorodichloromethane, 1,1,2-trichloro-1, 1,2-fluoroethane methylene chloride, and the like. The amount of foaming agent employed may be varied within a wide range. Generally, however, the halogenated hydrocarbons are employed in an amount from 1 to 50 parts by weight per 100 parts by weight of the polyol used in the production of the polyurethane composition. When water is employed as the blowing agent, it is present in the amount of from 0.1 to 10 parts by weight per 100 parts by weight of the polyether polyol. Halolgenated hydrocarbon blowing agents for use in the production of a foamed polyurethane composition are discussed in U.S. Pat. No. 3,072,582.

When it is desired to practice our invention in producing a floor coating or sealant, it is often desirable to include therein a polyhydric cross-linking agent. Such cross-linking agents include, but are not limited to polyhydric alcohols such as glycerol, trimethylolpropane, 1,2,6-hexanetriol or pentaerythritol, or amines such as ethylenediamine, N,N,N',N'-tetrahydroxypropylethylenediamine, and the like. These are included in the polyurethane composition such that they make up from about 0.02 wt. % to about 10 wt. % based upon the entire polyurethane composition. The use of such cross-linking agents are well-known and those skilled in the art will be able to readily determine the amount and type of cross-linking to use in order to achieve desired physical properties.

The chain-extending agent of our invention as described above is used in both solid polyurethane compositions and the self-skinning flexible or semi-flexible polyurethane foam composition. The amount of the chain-extending agent may be as low as 0.1 weight percent based on the polyol component in a solid elastomer polyurethane composition to about 50 weight percent of the entire formulation when used in the self-skinning foam polyurethane composition. It may be used either alone as the chain-extending agent or in conjunction with known chain-extending agents such as 1,4-butanediol, diethylene glycol, 4,4'-methylene bis(2-chloroaniline), and the like. However, we have discovered that whether used alone or in conjunction with known chain-extending agents, the chain-extender of our invention improves the tensile strength of the resulting polyurethane composition without detriment to other desired physical properties. When used in solid polyurethane compositions, the amount of 0.1 weight percent to about 15 weight percent, based upon the weight of the polyether polyol, and more preferably from about 0.5 to about 7 weight percent is employed.

In the production of the cellular self-skinning polyurethane compositions, the chain-extending agent used in the practice of our invention would be present in the amounts of from 10 weight percent to about 50 weight percent of the polyurethane reaction mixture, with preferred amounts being from about 15 weight percent to about 35 weight percent.

The chain-extender may be incorporated in the polyurethane compositions of our invention which are produced by either "one-shot" or prepolymer methods. In the "one-shot" system all the reactants and additives are mixed and reacted simulatneously. In the prepolymer system a portion of a polyhydroxy compound is reacted with the organic polyisocyanate to form a reaction product which has unreacted isocyanate groups. This reaction product is then mixed and reacted with the rest of the polymeric polyhydroxy compound to form the polyurethane composition.

In reacting the polymeric polyhydroxy compound with the organic polyisocyanate, the ratio of isocyanate groups to hydroxyl groups is between about 0.8 to about 1.5. This ratio, called the isocyanate index, is preferably between 0.9 and about 1.3 for the solid polyurethane composition and 0.8 to about 1.3 for the cellular self-skinning product. An especially preferred range for both polyurethane compositions is from about 0.95 to about 1.2. An isocyanate index of about 1.0 has been found to give very good products.

The following examples will more particularly illustrate our invention and should be considered for purposes of illustration only and not limitation thereof.

EXAMPLE I

To a 1000 ml 3-necked round bottomed flask fitted with mechanical stirrer, thermometer, condenser and bubbler and $N_2$ inlet tube was added 476 g of JEFFAMINE® D-2000 polyoxypropylenediamine* (equivalent wt.=952.0 g, 0.5 equivalent added) and heated to ~40° C. Isatoic anhydride (81.5 g, 0.5 equivalent) was added as a solid over a 10-20 minute period with accompanying $CO_2$ evolution and a slight exotherm. The reaction mixture was heated to 50° C. over a 30 minute period and then heated from 50° C. to 105°-106° C. over a 90 minute period. The reaction was held at 105°-106° C. for 30 minutes. No further $CO_2$ evolution was noted. The product contained no solids and was a fluid, pourable liquid even at room temperature. The spectral data including IR and NMR support the aromatic diamine-diamide structure shown below and the GPC indicates a major peak at ~7¼ minutes.

The total amine content was 0.81 meq/g and the tertiary amine content was 0.03 meq/g. The product was a clear brown liquid, was easily poured at room temperature and had a structure as follows:

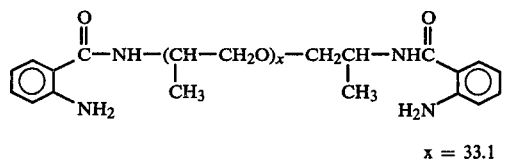

$x = 33.1$

The infrared spectrum indicated the product was of the aromatic aminebenzamide type and the benzoic aciduramido type inpurity was absent or minimal. The NMR spectrum was also in accord with the above aromatic amine-benzamide type structure.

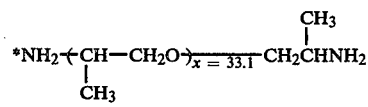

EXAMPLE II

To a 3-1., round-bottomed flask fitted with mechanical stirrer, thermometer, condenser and bubbler, and $N_2$ inlet was added 612.0 g of JEFFAMINE® D-400 polyoxypropylene diamine* (1.5 moles). The material was heated under $N_2$ to 108°-109° C. and 244.5 g of isatoic anhydride (1.5 moles) was added portionwise over 55 minutes. The pot temperature was increased to 120°-25° C. and another 244.5 g isatoic anhydride (1.5 moles) added (total 3.0 moles isatoic anhydride added). The reaction mixture was heated to 150°-156° C. for 2 hours. The product weighed 979 g and was a clear brown viscous material containing 2.82 meq/g total titratable amine and 0.03 meq/g tertiary amine. At room termperature, a bottle tipped on its side flowed only very slowly as a liquid. The product was the same as Example 1 product except x=5.6.
*The diamine reactant of Example 1 were x=5.6.

EXAMPLE III

To a 3-1. round-bottomed flask fitted as described above was added 490.0 g (1.2 moles) of JEFFAMINE® D-400 and 762.0 g of JEFFAMINE D-2000 (0.4 mole), mole ratio D-400/D-2000=3/1. The amines were heated to 80° C. under $N_2$ pad and 261 g (1.6 moles) isatoic anhydride was added spoonwise at 80°-95° C. over a 25-minute period. After digestion for about 30 minutes and heating to 100° C. the remaining isatoic anhydride (261 g; 1.6 moles) was added spoonwise at 100°-109° C. After addition was complete, the reaction mixture was heated at 130° C. and held there for about 2 hours. At this point $CO_2$ gas evolution was very slow. The reacton mixture was heated further to 150° C. and held there for 1 hour and 20 minutes. The product was a clear, brown liquid and weighed 1642 g. The infrared and NMR spectra data indicate the product was essentially of the aromatic amine-benzamide type structure. The product contained 1.86 meq/g total titratable amine content and 0.03 meq/g tertiary amine content. The material was a viscous liquid at room temperature.

EXAMPLE IV

To a 3-1., round-bottomed flask fitted as described before was added 408.0 g (1.0 mole) JEFFAMINE® D-400 and 952.0 g (0.5 mole) JEFFAMINE® D-2000, mole ratio D-400/D-2000=2/1. The amines were heated to 80° C. under $N_2$ pad and 489.0 g isatoic anhydride (3.0 moles) was added spoonwise over a 3 hour period with temperature of the reaction mixture slowly increased from 80°-119° C. by increasing the heat added to the system (heating mantle). After the addition was completed, the reaction mixture was heated to 150° C. and held there for about an hour, and heated further to 170° C. and held there for 15 minutes. The product was a clear brown viscous liquid with 1.67 meq/g total titratable amine content and 0.03 meq/g tertiary amine content. The NMR and IR spectra confirmed the proposed aromatic amine-benzamide type structure.

EXAMAPLE V

To a 3-1., round bottomed flask fitted as described in Example II was added 204.0 g (0.5 mole) of JEFFAMINE® D-400 and 952.0 g JEFFAMINE° D-2000 (0.5 mole), mole ratio D-400/D-2000=1/1. The amines were heated to 80° C. and 326.0 g (2.0 moles) isatoic anhydride added (spoonwise) over a 2-hour, 20-minute period, with the temperature being increased gradually from 80° C. to 108° C. After the addition of isatoic anhydride was complete, the reaction mixture was heated to 130° C. and held there for about an hour, then heated further to 155° C. (there was very little $CO_2$ evolution at 130° C.) and held there at 155°-160° C. for 1 hour and 15 minutes. The product was a clear brown liquid weighing 1397 g (theory for 2 moles of $CO_2$ evolution=1394 g). The infrared and NMR spectra confirmed the aromatic amine-benzamide type structure. The material contained 1.38 meq/g total titratable amine content and 0.04 meq/g tertiary amine content.

EXAMPLE VI

To a 3-1. flask fitted as described in Example II was added 550.8 g of JEFFAMINE® D-400 (1.35 moles) and 292.8 g of JEFFAMINE® D-2000 (0.15 mole), mole ratio of D-400/D-2000=9/1. The amines were heated to 100° C. and 244.5 g (1.5 moles) isatoic anhydride was added spoonwise over a 1 hour and 20 minute period. The reaction mixture was heated to 120° C. and 244.5 g (1.5 mole) more isatoic anhydride was added over a 15 minute period. The reaction mixture was heated to 150° C. and held for 2 hours. The product was a clear, brown, viscous liquid weighing 1208 g (theory=1201 g for 3 moles $CO_2$ evolution). The product contained 2.29 meq/g total titratable amine content and 0.02 meq/g tertiary amine content. Spectral data (IR and NMR) supported the aromatic amine-benzamide type structure.

EXAMPLE VII

To a 1-1. 3-necked round bottomed flask fitted as described in Example II was added 47.5 g JEFFAMINE® D-230* (0.2 mole) and 190.4 g JEFFAMINE D-2000 (0.1 mole), D-230/D-2000 mole ratio=2/1. The amines were heated to 80° C. and 97.8 g isatoic anhydride (0.6 mole) was added over a 35-minute period at 80° C. and then heated over a 35-minute period (80°-86° C.). The reaction mixture was then heated to 150° C. and held there for 1 hour, 20 minutes. The product was a clear, brown, viscous liquid weighing 310.9 g (theory=309.3 g for the evolution of 0.6 mole $CO_2$). The product contained 1.79 meq/g total titratable amine content and 0.02 meq/g tertiary amine content. NMR and IR spectra data supported the amine-benzamide structure.

*The diamine reactant of Example I where x=2.6.

EXAMPLE VIII

To a 3-1. round-bottomed flask as in Example II was added 142.5 g JEFFAMINE® D-230 (0.6 mole) and 1142.4 g D-2000 (0.6 mole). The amines were stirred and heated to 80° C. and 391.2 g (2.4 moles) of isatoic anhydride was added spoonwise over a 55 minute period at a temperature range of 80°-90° C. The reaction mixture was heated to 140° C. (45 minutes) and held at 140° C. for 1 hr. The product was a clear brown liquid with 1.37 meq/g total amine content and IR and NMR spectra data indicated the benzaminde-aromatic amine structure. The product was liquid in nature.

EXAMPLE IX

To a 3-1., round-bottomed flask equipped as described in Example II was added 390 g of JEFFAMINE® T-403 polyoxypropylene triamine* (0.9 mole or 2.7 amine equivalents) and 195 g of JEFFAMINE D-2000 polyoxypropylene diamine (0.1 mole or 0.2 amine equivalent). The amines were stripped and heated to 110° C. under a $N_2$ purge. At 110° C. addition of isatoic anhydride (IA) was started (added 489 g or 3.0 mole). Isatoic anhydride was added over a 2-hour period with the temperature range being 110° C.-132° C. After the addition was complete, the reaction mixture was heated to 158° C. and held at ~155° C. for 2 hours. The product solidified upon cooling, but did not crystallize. Product weight was 950.8 g. Theory predicts 956.4 g assuming a 2.9 mole $CO_2$ loss (127.6 g). Spectral data (IR and NMR) confirmed the products identity as well as the total amine content of 2.74 meq/g. GPC confirms the presence of both the IA+T-403 as well as the IA+D-2000 reaction products. The IA-T-403 reaction product was as follows:

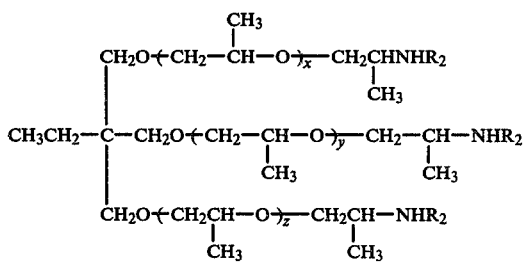

where $R_2$ is

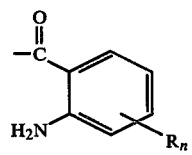

and x + y + z = 5.6.

-continued

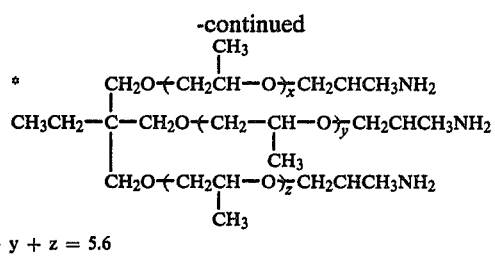

$x + y + z = 5.6$

EXAMPLE X

To a 3-l., round-bottomed flask fitted as described in Example II as added 347.3 g of JEFFAMINE ® T-403 triamine (a polyoxypropylene triamine with molecular weight of ~433.3 g/mole) equal to 0.8 mole or 2.4 amine equivalents, followed by 390.4 g of JEFFAMINE D-2000 (0.2 mole or 0.4 amine equivalents). The amines were purged with $N_2$ and heated to 100° C. with stirring. Isatoic anhydride (326 g, 2.0 moles) was added over a 20-minute period (100°-106° C.) and after the addition was complete the reaction mixture was heated to 150° C. over a 1-hour period. It was held at 150° C. for 1¼ hours before heating to 155° C. where it was held another hour. The product was a brown viscous liquid weighing 978 g. Theory was 976 g for the loss of 2 moles $CO_2$. Spectral data (IR, NMR, GPC) supported the assigned structure of an aromatic amine-amide.

EXAMPLE XI

Similar to Example 10, 390.7 g of JEFFAMINE ® T-403 (0.9 mole, 2.7 amine equivalents) and 195.2 g of JEFFAMINE D-2000 (0.1 mole, 0.2 amine equivalent) were heated to 108° C. under an $N_2$ purge. Isatoic anhydride (326.0 g, 2.0 moles) was added over a 1-hour and 5-minute period (temperature ranged from 108° to 130° C.). The reaction mixture was heated to 150° C. after the addition of IA was completed. The reaction mixture was held at ~152° C. for 2 hours. The product was a viscous liquid weighing 827.7 g (theory for 2 moles of $CO_2$ evolution=824 g). Spectral data indicate the reaction between IA and the polyoxypropylene amines proceeded to afford the desired aromatic amine-amide containing both aromatic amine groups and unreacted aliphatic primary amine. Total amine content of the product was 3.12 meq/g.

EXAMPLE XII

To a 3-l., round bottomed flask fitted as described in Example II was added 412.3 g of JEFFAMINE ® T-403 (0.95 mole, or 2.85 amine equivalents). The polyoxypropylenetriamine was heated to 110° C. under a $N_2$ blanket and at this temperature (110° C.) isatoic anhydride addition was begun (added 489.0 g, 3.0 moles). The addition was done at 110°-128° C. over a 2-hour and 10-minute period. After the addition of IA was complete the reaction mixture was heated to 156°-158° C. and held there approximately 2 hours. The product (hot) was a brown clear liquid at ~140° C. but became a solid (brittle) upon cooling. Product weight was 778.5 g (theory expected 776 g for the evolution of 2.85 moles $CO_2$). Upon heating to ~120° C. the product could be poured. The total amine content was 3.28 meq/g and the spectral data (IR, GPC, and NMR) agreed with assigned structure of an aromatic amine-amide.

The following example will show the utility of a typical aromatic amine-amide of the invention as a chain-extender in the preparation of a foam. More specifically, a flexible urethane foam was prepared wherein the tensile and tear strength properties and elongation properties of the foam were improved through use of the chain-extender.

EXAMPLE XIII

A number of flexible foams were prepared from the following formulations outlined in Table I below.

TABLE I

| Formulation, pbw. | Foam No. 1 | Foam No. 2 | Foam No. 3 |
|---|---|---|---|
| THANOL-F3520[1] | 100 | 100 | 100 |
| Chain-extender | — | 5[2] | 10[2] |
| Water | 4.0 | 4.0 | 4.0 |
| L-520 silicone | 1.0 | 1.0 | 1.0 |
| THERMOLITE T-10 catalyst[3] | 0.5 | 0.5 | 0.5 |
| DABCO 33LV[4] | 0.3 | 0.3 | 0.3 |
| Toluene diisocyanate | 48.4 | 48.5 | 49.2 |
| Isocyanate index | 1.05 | 1.05 | 1.05 |

[1]3500 molecular weight glycerin-based triol available from Jefferson Chemical Co.
[2]Two mole isatoic anhydride + one mole JEFFAMINE ® D-2000; 0.9 meq/g amine content - Example II.
[3]50% stannous octoate in dioctyl phthalate available from Metal and Thermit.
[4]33% triethylenediamine in dipropyleneglycol available from Air Products.

Foams from the above formulations were then prepared as summarized below in Table II. As can be seen foam properties are markedly improved utilizing the chain-extenders of the invention.

TABLE II

| Foam No. | 1 | 2 | 3 |
|---|---|---|---|
| Details of Preparation | | | |
| Cream time, sec. | 12 | 10 | 10 |
| Rise time, sec. | 85 | 93 | 95 |
| Foam Properties | | | |
| Density, pcf | 1.74 | 1.74 | 1.98 |
| Tensile, psi | 18.8 | 19.4 | 22.3 |
| Elongation % | 235 | 233 | 372 |
| Tear, pli | 3.0 | 3.05 | 4.8 |
| Compression set (Method B) | | | |
| 50% | 8.6 | 8.1 | 10.3 |
| 90% | 16.3 | 25.3 | 60.6 |
| Humid Aging (5 hr. at 250° F.) | | | |
| Compression set, 50% | 7.5 | 9.1 | — |
| CLD loss, 50% | 20.0 | 22.3 | 41.2 |

The compositions of the invention are also useful as curing agents in epoxy resin formulations, and in addition are useful in a variety of end-uses where amines and/or amides may be employed.

We claim:
1. A compound comprising a reaction product of a polyoxypropylene polyamine selected from the group consisting of diamines, triamines and mixtures thereof, and having an average molecular weight of 190 to about 3000 and an isatoic anhydride of the formula:

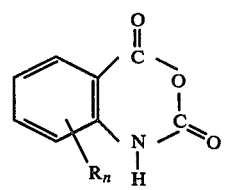

where R is selected from the group consisting of hydrogen, alkyl nitro, halo, hydroxy, amino, and cyano, and n is a number of 1-4.

2. The compound of claim 1 having the following structural formula:

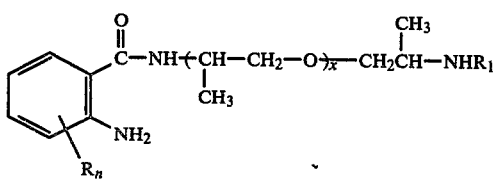

where $R_1$ is hydrogen or:

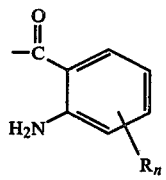

and x is an average number ranging from about 2 to about 40.

3. The compound of claim 1 which has the following structural formula:

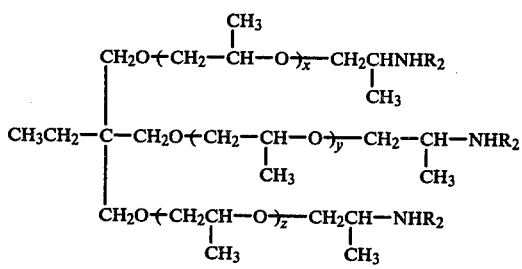

where $R_2$ is hydrogen or:

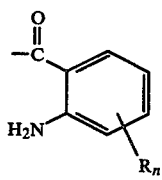

where x, y and z represent average numbers ranging from about 1 to about 15 with the sum of x, y and z ranging from about 3 to about 50.

4. A polyurethane composition prepared by reacting an organic polyisocyanate with a polymeric polyhydroxy compound and a chain-extending agent comprising a reaction product of a polyoxypropylene polyamine selected from the group consisting of diamines, triamines and mixtures thereof, and having an average molecular weight of 190 to about 3000 and an isatoic anhydride of the formula:

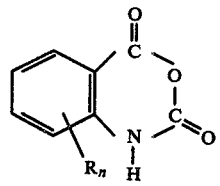

where R is selected from the group consisting of hydrogen, alkyl nitro, halo, hydroxy, amino, and cyano, and n is a number of 1–4.

5. The polyurethane of claim 4 wherein said chain-extending agent has the following structural formula:

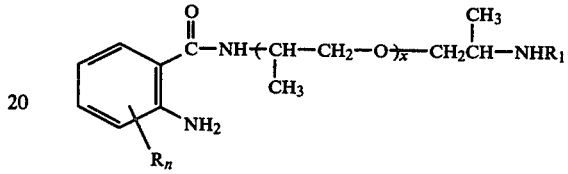

where $R_1$ is hydrogen or:

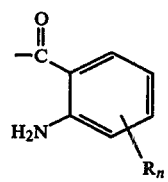

and x is an average number ranging from about 2 to about 40.

6. The polyurethane composition of claim 4 wherein said chain-extending agents has the following structural formula:

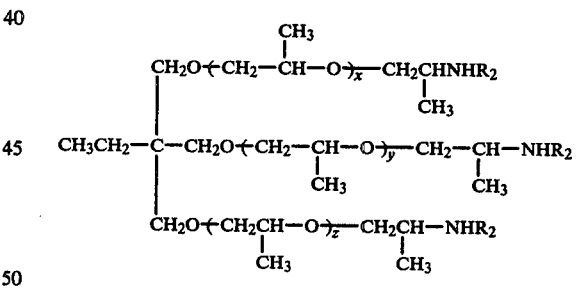

where $R_2$ is hydrogen or:

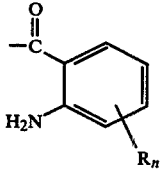

where x, y and z represent average numbers ranging from about 1 to about 15 with the sum of x, y and z ranging from about 3 to about 50.

* * * * *